United States Patent [19]
Andrews et al.

[11] 3,863,870
[45] Feb. 4, 1975

[54] SPIN STABILIZED VEHICLE AND SOLAR CELL ARRANGEMENT THEREFOR

[75] Inventors: George J. Andrews, Los Angeles; Harold A. Rosen, Santa Monica, both of Calif.

[73] Assignee: Hughes Aircraft Company, Culver City, Calif.

[22] Filed: Oct. 25, 1973

[21] Appl. No.: 409,518

Related U.S. Application Data

[60] Continuation of Ser. No. 270,107, July 10, 1972, abandoned, which is a division of Ser. No. 886,332, Dec. 18, 1969, Pat. No. 3,722,840.

[52] U.S. Cl. ................................. 244/173, 136/89
[51] Int. Cl. ............................................. B64g 1/10
[58] Field of Search .............. 244/1 SP, 173; 136/89

[56] References Cited
UNITED STATES PATENTS

| | | | |
|---|---|---|---|
| 3,459,391 | 8/1969 | Haynos | 244/1 SP |
| 3,544,041 | 12/1970 | Billerback et al. | 244/1 SP |
| 3,758,051 | 9/1973 | Williams | 244/1 US X |
| 3,785,590 | 1/1974 | Wentworth | 244/1 SP |
| 3,817,481 | 6/1974 | Berks et al. | 244/173 |

Primary Examiner—Trygve M. Blix
Assistant Examiner—Barry L. Kelmachter
Attorney, Agent, or Firm—James K. Haskell; Noel B. Hammond

[57] ABSTRACT

A spin-stabilized vehicle comprising (1) a body and (2) three deployable panels, arranged to present body and panel surfaces covered with photovoltaic or solar cells for increasing the stability and the sun derived power of the craft. The panels are stowed within or wrapped about the craft during ascent towards its utilizable position. When deployed, the panels extend radially from the craft. When extended, the panels are at least as long as the radius of the body. The use of three panels results in a relatively small ripple of the power supplied by the cells as the craft rotates and therefore a relatively high efficiency of cell utilization is provided.

4 Claims, 12 Drawing Figures

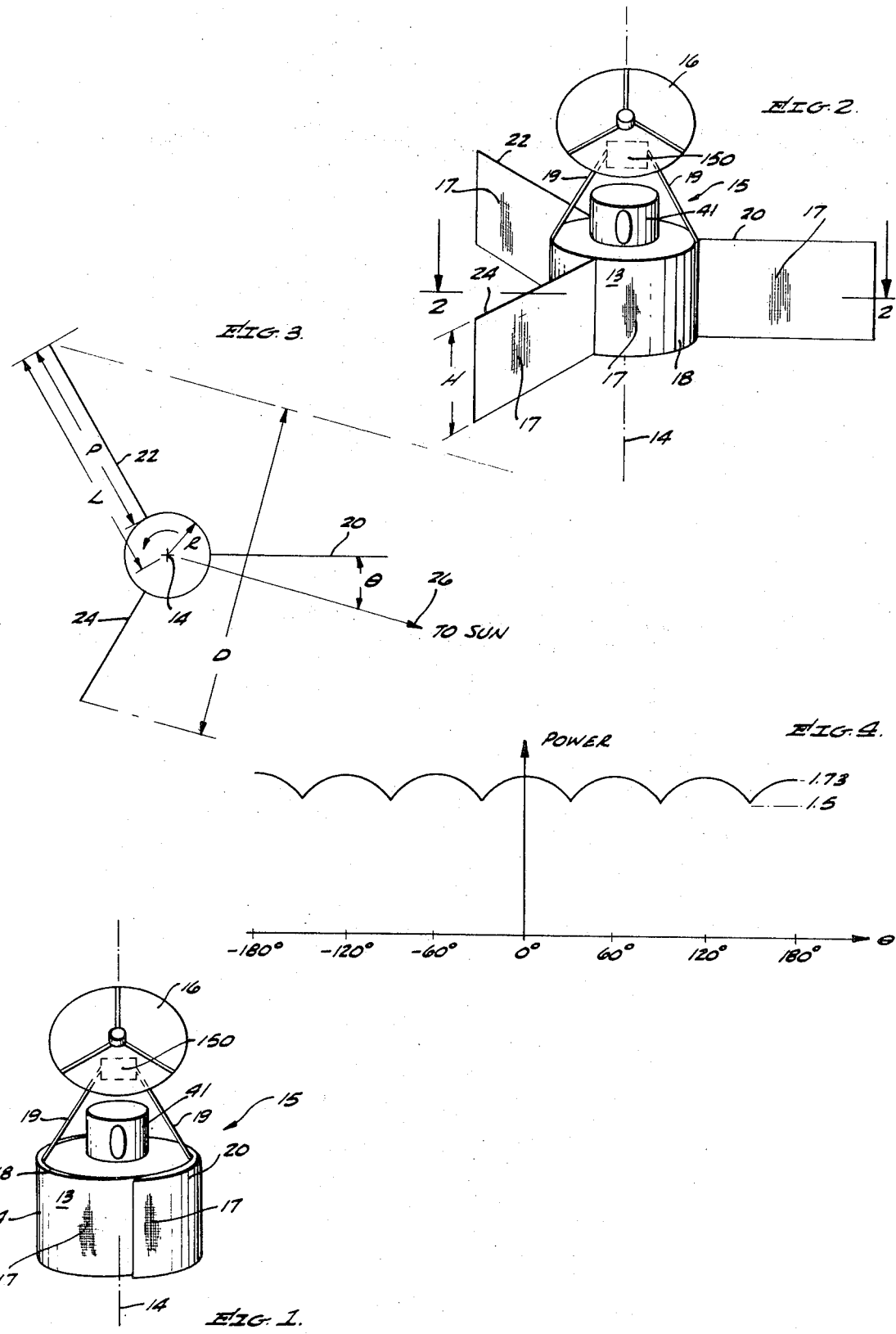

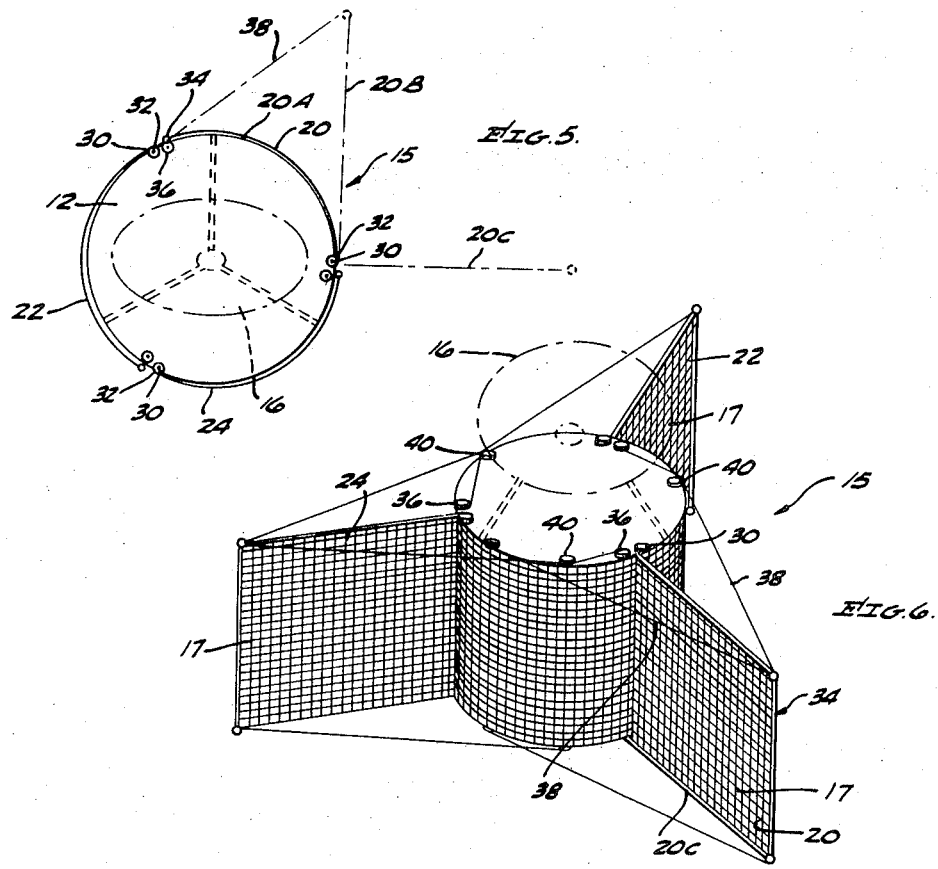
FIG.5.
FIG.6.
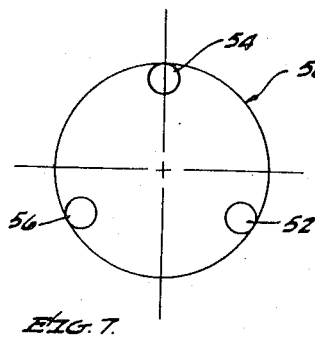
FIG.7.
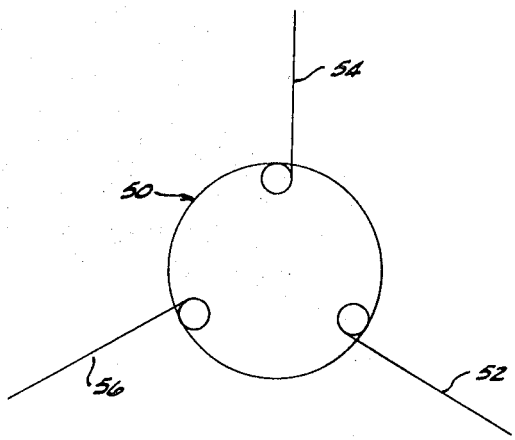
FIG.8.

PATENTED FEB 4 1975 3,863,870
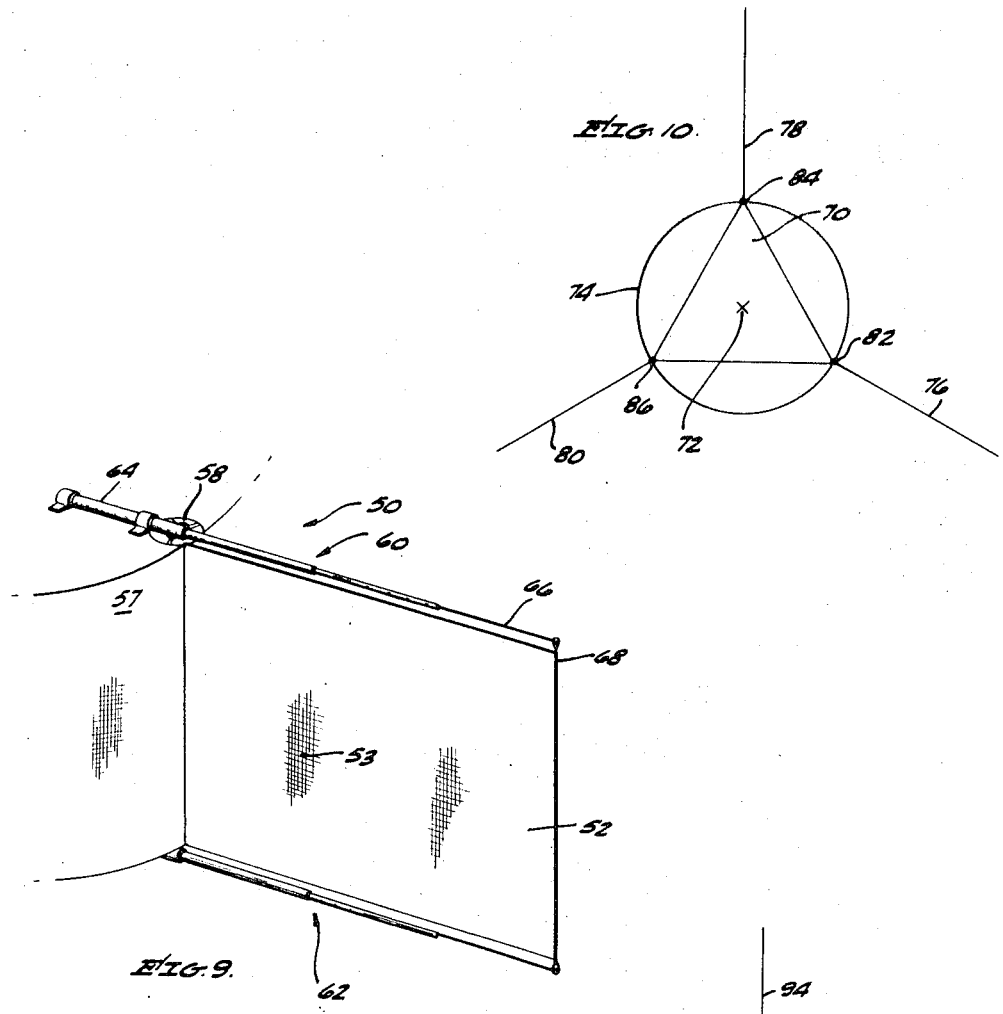
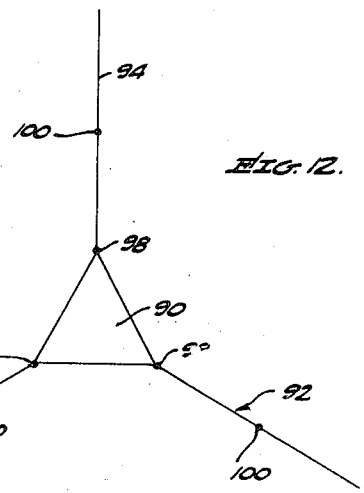
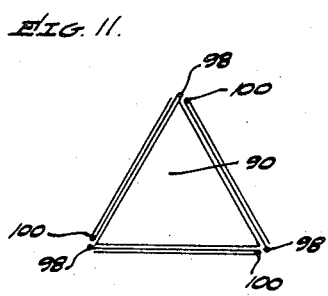

SPIN STABILIZED VEHICLE AND SOLAR CELL ARRANGEMENT THEREFOR

This is a continuation of application Ser. No. 270,107, filed July 10, 1972 which is a division of application Ser. No. 886,332, filed Dec. 18, 1969, now U.S. Pat. No. 3,722,840.

BACKGROUND OF THE INVENTION

1. Field of the Invention:

This invention relates to vehicles employable in space, atmospheric, gas and vacuum environments and to photovoltaic cell disposition thereon. More particularly, the invention relates to a craft having a spin-stabilizable rotor, deployable panels from the craft to, in extended position, provide increased stability, and having photovoltaic cells disposed upon the craft body including disposition of such cells upon the panels such as to avoid causing shadowing of individual cells of groups connected in series and consequent loss of usable power and to provide increased exposure to utilizable energy.

2. Description of the Prior Art:

A spin-stabilized craft is unstable unless it has a larger moment of inertia about its axis of rotation as compared with any transverse axis. If the craft is a long narrow cylinder, for example, then its moment of inertia about its cylindrical axis is much lower than its moment of inertia about any axis transverse to its cylindrical axis. If such a craft is subjected to a dissipative force, the wobbling and nodding movements resulting therefrom will not be damped and the craft will eventually rotate about its axis of greatest inertia. Rotational stability is achieved by making the moment of inertia about the desired rotational axis greater than about any transverse axis, and preferably substantially greater, such as at least 10 percent greater. The greater stability can be achieved by the use of a squat or disc-like configuration, but the shroud which encloses the craft is generally long and narrow, and a squat vehicle would waste considerable space.

One way of increasing the moment of inertia about the axis of rotation of a spin-stabilized vehicle is to employ arms with weights at their ends, the arms being deployable to radiate from the vehicle or craft after it is in its usable environment such as in space. However, this can give rise to problems of power fluctuations. The power fluctuations arise in the case of spacecraft that are covered with solar cells that provide power to energize its electrical systems. The stabilizing arms can cast shadows that prevent light from reaching some of the solar cells, and result in a large reduction in power. The large reduction is due to the fact that large numbers of small silicon cells are generally used, which are connected in series. A shadow on any cell in a series increases its resistance to a very high value, thereby stopping the flow of power through that series of cells. The ripple in power could be reduced by the use of large capacitors, but the increased weight and other disadvantages make this prohibitive for many applications. Accordingly, the ripple portion of the power supply often cannot be used, and therefore a lower level of continuously sustainable power is available in such applications.

OBJECTS AND SUMMARY OF THE INVENTION

An object of the present invention is to provide a spin-stabilized vehicle structured to provide increased stability of orientation, more efficient utilization of solar cells carried thereon and a greater photovoltaic or solar cell carrying surface.

Another object is to provide a vehicle having a body and appendages structured to enable compactness prior to and during movements to utilizable position and to enable deployability of the appendages in utilizable locations and wherein the body and appendage surfaces are covered with radiant energy absorbing cells such as to enable stable orientation and increased power output during utilization of the vehicle.

In accordance with one embodiment of the invention, a spin-stabilized vehicle which may be a spacecraft is provided which employs photovoltaic cells in a manner that increases the stability of rotation of the craft and increases the amount of usable power which it can derive from the sun or other source of radiant energy. The craft includes a body, usually cylindrical, covered with photovoltaic cells and three relatively long panels which are also covered with photovoltaic cells. The panels can be deployable after the craft has separated from its launch vehicle, so they extend from the body. The weight of the extended panels increases the moment of inertia of the craft about its axis of rotation, while increasing the photovoltaic cell area exposed to the sun or other radiating source to increase power to the craft. The use of three long extended panels results in a minimum fluctuation of power as the craft rotates in space, and results in efficient utilization of the cells.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of a spacecraft constructed in accordance with a first preferred embodiment of the invention, illustrating a body and panels each covered with solar cells mounted thereon and wherein the spacecraft is in an undeployed position and supports a rotatively bearingly mounted relatively despun antenna and an infrared camera;

FIG. 2 is a perspective view of the embodiment of FIG. 1 but with the panels illustrated in a fully deployed position;

FIG. 3. is a simplified cross-sectional view taken along the lines 2—2 of FIG. 2, and further illustrating the orientation of the spacecraft with respect to the sun;

FIG. 4 is a graphical representation showing the variation of power output from the solar cell assembly plotted against the rotational position of the spacecraft of FIGS. 1-3 when deployed, oriented and rotated as illustrated in FIG. 3;

FIG. 5 is a simplified plan view of the spacecraft of FIG. 1, showing some of the details of the mechanism thereof.

FIG. 6 is a perspective view of the spacecraft as illustrated in detail in FIG. 5 but in a fully deployed position;

FIG. 7 is a simplified plan view of a spacecraft comprising a body and deployable panels constructed in accordance with a second preferred embodiment of the invention, the spacecraft being shown in an undeployed position;

FIG. 8 is a view similar to FIG. 7, showing the panels of the spacecraft in a fully deployed position;

FIG. 9 is a partial perspective view of the spacecraft of FIG. 8, showing some details of a representative deployment mechanism therefor;

FIG. 10 is a simplified plan view of a spacecraft constructed in accordance with a third embodiment of the invention, with its panels in a fully deployed position;

FIG. 11 is a simplified plan view of a spacecraft constructed in accordance with a fourth embodiment of the invention, with the panels thereof in an undeployed position; and FIG. 12 is a view of the spacecraft of FIG. 11 with the panels thereof fully deployed.

DESCRIPTION OF THE PREFERRED EMBODIMENTS

FIGS. 1 and 2 illustrate a spin-stabilized vehicle, for example, a spacecraft 15 with a cylindrically shaped body 13 which is designed to rotate about its cylindrical axis 14. The craft 15 is of a type which may be placed in orbit around the earth to relay signals and/or to take pictures. Vehicle 15 may also be a vehicle other than a spacecraft such as a craft suitable for operation in a gaseous medium or atmosphere such as a hovercraft, a missile or an aircraft, a craft to be operated on an air cushion close to the earth's surface, a laboratory vehicle and for other uses. While, for purposes of illustration an inertially disk-shaped rotating spacecraft 15 is shown, it will be appreciated that the invention is also applicable to other types of spacecraft, for example, the Gyrostat spacecraft manufactured by the Hughes Aircraft Company, Space Systems Division, El Segundo, Calif. Suitable payload devices such as an infrared camera 41 may be provided and fixedly mounted to the body 13 to enable viewing between legs 19 of a tripod (not numbered) which is provided. Within the scope of the invention other suitable payload devices (not illustrated) such as infrared, multispectral or black and white cameras or other sensing devices could also be provided. A directional antenna 16 is provided and is mounted on bearings (not shown) on the spinning axis 14, so that the antenna 16 does not rotate with the body 13 of the craft 15. The bearings (not shown) may be supported on the top of the legs 19 of the tripod (not numbered). The antenna 16 can therefore remain pointing in a particular direction while the axis 14 of the body 13 is oriented perpendicular to the earth's equatorial plane. Also without departing from the scope of the invention, rotating antennas may be additionally or alternatively provided. Three flexible rectangular-shaped panels 20, 22 and 24 are provided. Each of panels 20, 22 and 24 is attached to the body 13 at body 13 peripheral equally spaced intervals along one of the panel's shorter rectangular edges. Each of the panels 20, 22 and 24 is covered on its opposite side rectangular surfaces with photovoltaic or solar cells 17. Solar cells 17 are also mounted on the cylindrical surface 18 of the body to provide a substantially continuous body and panel solar cell covered surface around the craft 15.

A source of energy for operating the electrical apparatus (not all shown) in the body 13 is derived from the solar cells 17 that are mounted on the cylindrical surface 18 of the body and on the surfaces of the three panels 20, 22 and 24. During ascent, the spacecraft 15 is enclosed by the cylindrical portion of a shroud (not illustrated in FIGS. 1–3), and the craft 15 is in the configuration shown in FIG. 1. However, after the shroud (not illustrated in FIGS. 1–3) is ejected, the craft 15 achieves the orientation shown in FIG. 2, wherein the three panels 20, 22 and 24 have been deployed substantially radially from the body 13. It will be understood also that within the scope of the invention deployment of panels 20, 22 and 24 may deviate from radial orientation. Motor means 150 schematically illustrated in dashed representation are provided to rotate the rotor or body. Means (not illustrated) are provided to change the orbit and/or attitude of the spacecraft 15.

The deployment of the three panels 20, 22 and 24 substantially increases the moment of inertia of the spacecraft 15 about its axis of rotation 14. Originally the craft 15 may have a moment of inertia about its axis 14 which is less than 1.0 times its moment of inertia about any transverse axis. It will be realized that fuel consumption will cause changes in the moment of inertia ratio. When deployed, the three panels 20, 22 and 24 would increase the ratio of the moment of inertia about axis 14 to the moment of inertia about any transverse axis to over 1.0 even though the panels 20, 22 and 24 may be of relatively light weight. The increase of the ratio of moments of inertia over 1.0 would then make the craft 15 stable. By covering the panels 20, 22 and 24 with solar cells not only is stability achieved, but also a substantial increase in power output results.

The spacecraft 15 is generally spun about its axis 14, which is generally oriented perpendicular to the earth's equatorial plane although it sometimes may be angled from the preferred position. Various rotational rates may be utilized provided the rate is sufficient for spin-stabilization. For example, 60 revolutions per minute may be used for a particular craft and utilization. As the craft 15 rotates, the total light incident on the cells 17 of the body surface 18 and panels 20, 22 and 24 varies. FIG. 3 indicates the manner of variation of the spacecraft rotational position about its axis 14 with respect to the direction of the sun as indicated by arrow 26 when the sun and vehicle are in a plane normal to the spin axis 14. The rotational position of the craft 15 can be defined by the angle $\theta$ between one panel 20 of the craft and a line to the sun. The amount of sunlight falling on the craft 15 is proportional to the height H (see FIG. 2) of the panels 20, 22 and 24 and the spacecraft body 13, times the distance D across the craft 13 in a direction perpendicular to a line to the sun. The distance D varies with the rotational position of the craft 16, D being largest when the angle $\theta$ equals zero and being smallest when the angle $\theta$ equals 30°, for panels having a length P greater than R.

In order to effectively utilize the panels it is necessary that the distance L between the axis 14 and the tip of the panel 20, 22 and 24 (P + R) exceeds 2R, where R equals the radius or distance from the axis 14 to the surface of the body 13. In the first preferred illustrative embodiment the projected area normal to the sun line is given by the following formulas:

$A = \sqrt{3}Lh\cos\theta$, for $-30° < \theta < 30°$, and
$A = \sqrt{3}LH\cos(\theta - 60°)$, for $30° < \theta < 90°$ wherein the symbol $<$ means is less than. For a cylindrical spacecraft body, the limitation L is greater than 2R, means that each panel 20, 22 and 24 has a length P greater than the radius R of the craft 15. In such a situation, the power output of the solar cells 17 varies in the manner indicated by the graph of FIG. 4. FIG. 4 shows the variation in power output as a function of the angle $\theta$. For a minimum power of 1.5C watts (where C is a constant), the maximum power is $\sqrt{3}$C watts (i.e., about 1.73C watts). Only the minimum level 1.5C can be utilized, the ripple portion of the power which constitutes about 13 percent of it being wasted. A larger proportion of the power could be utilized if large ripple-reducing capacitors were employed. However, the extra weight required for such capacitors is generally prohibitive.

It would be possible to utilize a smaller number of panels such as two, or a larger number of panels such as four, instead of three panels. However, it has been found that three panels is the optimum number. If two panels are utilized, then the ripple portion of the power output, which is wasted, is also greater. The total amount of usable power with a two panels craft is no greater than the amount of usable power with a simple cylindrical craft of the same diameter having no panels. The use of four panels results in a higher ripple factor, and the amount of useful power per solar cell area (and therefore per unit weight of cell material) is lower than with three panels. The optimum utilization of cells in the type of spacecraft described above occurs when there are no panels, but the amount of power obtainable from exposure to the sun of a given size craft is much lower than that from exposure of a craft with panels.

In the case of a three panel spacecraft with L greater than 2R, (i.e., each of the panels extending from a cylindrical spacecraft has a length greater than the radius of the spacecraft body) the minimum illumination efficiency (which occurs when $\theta = 30°$) is given by the following formula:

Illumination efficiency = $1/4 [1/1 +(\pi/3 -1) R/L]$ where illumination efficiency is the ratio of the projected area (H × D) divided by the total area of cells on the craft 15. For a purely cylindrical array, this efficiency is $1/\pi$. With a three panel craft of the type described, approximately $4/\pi$ or 1.27 times as many cells are required for the same power output as for a purely cylindrical craft which is made large enough to yield the same power. The efficiency of the three panel craft is greater than for fewer or larger numbers of panels.

FIGS. 5 and 6 illustrate the manner of deployment of the three panels 20, 22 and 24. The panels 20, 22 and 24 are constructed of a flexible material such as Mylar substantially covered on both sides with photovoltaic cells 17. An inner end of each of the panels 20, 22 and 24 is connected to a pair of brackets 30 one at each end of the spacecraft body 13. The brackets 30 are pivotally mounted at pivots 32 on the craft 15 to allow the panels 20, 22 and 24 to pivot from the retracted or peripheral portion surrounding position 20A to the extending outwardly from the body deployed position 20C. The panels 20, 22 and 24 each have an outer end (not numbered) which terminates in a rod 34. Rods 34 extend substantially the height of the craft 15. A spool 36 around which wire 38 is wound in retracted position 20A is rotatably mounted on the top of the body 13. The wire 38 has an outer end (not numbered) fixed to the rod 34. A similar spool of wire is located at the lower end of the craft 15. When the spacecraft 15 first begins spinning, the wire 38 holds the rod 34 substantially against the cylindrical periphery of the body 13 to prevent the panels 20, 22 and 24 from flying out by centifugal force. Pads (not shown) prevent the solar cells 17 on the body 13 and on panels 20, 22 and 24 from touching when the panels 20, 22 and 24 are wrapped circumferentially about the body 13. A brake or escapement mechanism (not shown) on the shaft (not shown) of each spool 36 is then partially released to allow the spool 36 to unwind the wire 38 so that each of the panels 20, 22 and 24 can move outwardly under centrifugal and/or elastic forces. The panels 20, 22 and 24 each first unbend to the position 20B wherein the panels 20, 22 and 24 extend straight, but tangentially from the body 13, the panel outer end being held by wire 38 extending from the spool 36. As the wire 38 continues to be payed out, each panel 20, 22 and 24 starts bending in the opposite direction towards the position 20C. During this time, the bracket 30 pivots about its axis 32 to allow each of the panels 20, 22 and 24 to move out without bending. Finally, the panels 20, 22 and 24 reach the outward substantially radially extending straight orientation 20C which is the deployed position.

It should be appreciated that within the scope of the invention photovoltaic cells containing panels of different height than the craft body could be utilized.

Refer to FIG. 6. A wire guide 40 is provided for each wire 38. Each of the wires 38 is partially wrapped about its respective wire guide 40 when its respective panels 20, 22 and 24 is fully deployed to the position 20C. The wires 38 then help to stabilize their respective flexible panels 20, 22 and 24 against flexing or waving motions. Each guide 40 enables its respective supported wire 38 to extend at a maximum angle with the direction of the respective panel 20, 22 or 24, so that the wire 38 can apply maximum stability forces without tending to collapse the panel 20, 22 or 24 which it supports. Further stability is achieved by employing another wire 38 which extends on the opposite side of the panels 20, 22 and 24.

When the panels 20, 22 and 24 are deployed, their weight and that of the rods 34 at their outer ends substantially increases the moment of inertia of the craft 15 about its axis of rotation 14, while increasing the power which can be derived from the sun. Even before deployment of the panels 20, 22 and 24, the craft 15 depending upon configuration may be stable and the exposed cells 17 about the body 15 can supply substantial power to the electronic systems of the craft 15. However, after deployment, stability and power are both increased.

FIGS. 7 and 8 illustrate a spacecraft 50 constructed in accordance with another embodiment of the invention, wherein three solar cell or photovoltaic panels 52, 54 and 56 are held in multiturn rolls (not numbered) in the manner of window-shades. The panels 52, 54, and 56 can be deployed to the positions shown in FIG. 8 by centrifugal force and/or extendable structural booms (or beams). FIG. 9 illustrates some of the details of one form of structural boom usable in the spacecraft 50 shown in FIGS. 7 and 8. The panels 52, 54 and 56, which may be constructed of a Mylar film (not shown) with solar cells 53 mounted on both sides, are each originally held on a roller 58 that is rotatably mounted on the body 57 of the craft 50. As the craft 50 spins, the panels 52, 54 and 56 tend to deploy by centrifugal force. This force could be augmented by other means such as elastic means (not shown) to effect unwinding from the roller 58. In order to controllably deploy each of the panels 52, 54 and 56 and stabilize it after deployment, a pair of extendable booms 60, 62, which may be telescopic or otherwise extendable are provided at opposite ends of the spacecraft body 50. In the illustrated example, each boom 60 and 62 has a set of telescoping tubes comprising an inwardly disposed tube 64 fixed to the spacecraft 50, centrally disposed tubes (not numbered), and an outwardly disposed tube 66 fixed to a rod 68 at the outer end of each of the panels 52, 54 and 56. The centrifugal force (which could be augmented by positive acting means) of the spinning spacecraft 50 could be used to automatically extend the booms 60 and 62. An extension controlling mechanism (not shown), such as a wire running through each boom 60 and 62 and having an outer end fixed to the outer tube 66 and an inner end attached to a governor (not shown) could be used to assure controlled extension of the booms 60 and 62. After the booms 60 and 62 are deployed, they stabilize the panel 52 against flexing or waving.

FIG. 10 illustrates a third embodiment of the invention which utilizes a spacecraft 70 having a cross-section which is triangular when taken normal to the axis of rotation 72 of the craft 70. Three rigid panels 76, 78 and 80 and three respective supporting hinges 82, 84 and 86 therefor are provided. The craft 70 may be held in a cylindrical shroud 74. When held therein, each of the three panels 76, 78 and 80 is folded against a respective adjacent side of the craft 70. After the craft 70 passes out of the earth's atmosphere and the shroud 74 is removed, the panels 76, 78 and 80 can be deployed by swinging them about hinges 82, 84 and 86. This embodiment of the invention enables rigid panels 74, 76 and 78 to be used, which simplifies the construction of the panels 74, 76 and 78 and may make them more economical. The triangular shape of the spacecraft 70 does not efficiently utilize the space inside the shroud 74.

FIGS. 11 and 12 illustrate still another embodiment of the invention, similar to the embodiment shown in FIG. 10. but which enables longer panels to be employed. Three panels 92, 94 and 96 are provided. In this embodiment of the invention, each of the panels 92, 94 and 96 has two parts (not separately numbered) which are folded on one another and on a side of the triangular body 90 of the craft during ascent. Each of the three panels 92, 94 and 96 has an inner hinge 98 that pivotally connects it to the spacecraft body 90 and an outer hinge 100 that connects the outer panel section (not numbered) to the inner panel section (not numbered). After ascent, the panels 92, 94 and 96 can be released so that they deploy to the positions shown in FIG. 12. As in the other embodiments of the invention, guy wires, booms or the like can be utilized to stabilize the panels 92, 94 and 96 if this is required.

Thus, the invention provides a spin-stabilized vehicle such as a spacecraft which can be held within a relatively small shroud during ascent through the earth's atmosphere. The craft can then deploy solar panels which both stabilize it and increase its power input from the sun. Three panels are utilized which are radially deployed with respect to the axis of rotation of the craft, to efficiently utilize the solar cells carried by the craft. It should be appreciated that within the scope of the invention, for certain applications, the panels need not be deployable but could be extended permanently and need not be shroud containable or launched therein.

While salient features have been illustrated and described with respect to particular embodiments, it should be readily apparent that modifications can be made within the spirit and scope of the invention, and it is therefore not desired to limit the invention to the exact details shown and described.

What is claimed is:

1. A vehicle comprising:
 a. a body having a substantially cylindrical portion with a substantially round circumference and a central axis,
 b. three rollers rotatably mounted to said body at substantially uniformly spaced locations around the circumference thereof substantially parallel to said central axis,
 c. three flexible substantially rectangular elongated solar panels each mounted to a single one of said rollers and having side surfaces,
 d. a plurality of photovoltaic cells mounted on the cylindrical surface of said body and on the side surfaces of said panels, and
 e. means to deploy said panels from a first position wherein said panels are retracted to said body and rolled up about said rollers to a second position wherein said panels extend substantially radially outwardly from said body and substantially coplanar with said central axis.

2. The vehicle of claim 1 wherein:
 a. three extendable booms are disposed thereon with one end mounted to said body and the other end fastened to the outer end of one of said panels for retraction and extension therewith.

3. The vehicle of claim 2 wherein:
 a. said extendable booms comprise a plurality of telescoping members.

4. The vehicle of claim 3 wherein:
 a. rods are mounted along the outer edge of each of said panels and the outer end of each of said extendable booms is fastened to said rods.

* * * * *